US012468258B2

(12) United States Patent
Di Domenico et al.

(10) Patent No.: US 12,468,258 B2
(45) Date of Patent: Nov. 11, 2025

(54) TIMEPIECE REGULATING MEMBER WITH A BALANCE SPRING PROVIDED WITH MEANS FOR GRAVITY COMPENSATION

(71) Applicant: The Swatch Group Research and Development Ltd, Marin (CH)

(72) Inventors: Gianni Di Domenico, Neuchâtel (CH); Baptiste Hinaux, Lausanne (CH); Mohammad Hussein Kahrobaiyan, Boudevilliers (CH); Jean-Luc Helfer, Le Landeron (CH); Pascal Winkler, St-Blaise (CH)

(73) Assignee: The Swatch Group Research and Development Ltd, Marin (CH)

( * ) Notice: Subject to any disclaimer, the term of this patent is extended or adjusted under 35 U.S.C. 154(b) by 299 days.

(21) Appl. No.: 18/344,236

(22) Filed: Jun. 29, 2023

(65) Prior Publication Data

US 2024/0027965 A1 Jan. 25, 2024

(30) Foreign Application Priority Data

Jul. 21, 2022 (EP) .................................... 22186305

(51) Int. Cl.
*G04B 17/06* (2006.01)
*G04B 17/04* (2006.01)

(52) U.S. Cl.
CPC ........... *G04B 17/06* (2013.01); *G04B 17/045* (2013.01)

(58) Field of Classification Search
CPC ......... G04B 17/06; G04B 17/32; G04B 18/02
See application file for complete search history.

(56) References Cited

U.S. PATENT DOCUMENTS 11,693,366 B2 * 7/2023 Winkler ................. G04B 17/08 368/168
2018/0284695 A1 * 10/2018 Maier .................. G04B 17/045
2020/0150595 A1 * 5/2020 Winkler ............... G04B 17/045
(Continued)

FOREIGN PATENT DOCUMENTS

CH 717 283 B1 10/2021
CH 718 191 A2 6/2022
(Continued)

OTHER PUBLICATIONS

European Search Report for 22 18 6305 dated, Nov. 11, 2022.

*Primary Examiner* — Sean Kayes
(74) *Attorney, Agent, or Firm* — Sughrue Mion, PLLC

(57) ABSTRACT

A regulating member (10) for a horological movement including a balance, a balance spring including a flexible strip (2) coiled on itself in several turns, the strip (2) having a predefined rigidity to enable the balance to perform a rotary oscillatory movement, the strip including an outer end (9). The regulating member (10) includes a resilient device for compensating the direction of gravity with respect to the regulating member (10), the resilient device adapting its stiffness according to gravity to compensate for the effect of gravity on the regulating member, the resilient device including a resilient element (5) connecting the outer end (9) to a first non-movable support (7) with respect to the horological movement, as well as prestressing means (6) for applying a variable force or torque on the resilient element (5) according to the direction of gravity with respect to the regulating member (10).

13 Claims, 1 Drawing Sheet

(56) References Cited

U.S. PATENT DOCUMENTS

| | | | | |
|---|---|---|---|---|
| 2021/0034016 | A1 * | 2/2021 | Helfer .................... | G04B 17/32 |
| 2021/0124306 | A1 * | 4/2021 | Winkler ................. | G04B 17/08 |
| 2022/0171336 | A1 | 6/2022 | Kahrobaiyan | |

FOREIGN PATENT DOCUMENTS

| | | | |
|---|---|---|---|
| EP | 4 009 115 | A1 | 6/2022 |
| JP | 2022-88332 | A | 6/2022 |

* cited by examiner

TIMEPIECE REGULATING MEMBER WITH A BALANCE SPRING PROVIDED WITH MEANS FOR GRAVITY COMPENSATION

CROSS REFERENCE TO RELATED APPLICATIONS

The present application is based on, and claims priority from the prior European Patent Application No. 22186305.3, filed on Jul. 21, 2022, the entire contents of which are incorporated herein by reference.

TECHNICAL FIELD OF THE INVENTION

The invention relates to a timepiece regulating member with a balance spring provided with means for gravity compensation.

TECHNOLOGICAL BACKGROUND

Most mechanical watches today are equipped with a sprung balance and a Swiss lever escapement mechanism. The sprung balance constitutes the time base of the watch. It is also called resonator or regulating member.

The escapement has two main functions:

to maintain the two-and-fro motions of the resonator;

to count these to-and-fro motions.

An inertial element, a guide and an elastic return element are required in order to constitute a mechanical resonator. Conventionally, a balance spring acts as a resilient return element for the inertial element formed by a balance. This balance is guided in rotation by pivots, which generally rotate in plain bearings made of ruby.

A frequency is selected for the mechanical resonator, which is determined to obtain a predefined rate for the horological movement.

However, during operation thereof, such a mechanical resonator might be subjected to disturbances caused by changes in external parameters, which cause variations in the frequency of the resonator. For example, these parameters are temperature, pressure, humidity, or gravity. The frequency variation of the resonator results in an error in the time measurement and therefore in the rate of the horological movement.

In the watchmaking industry, some documents of the prior art describe regulating members, which take account of the effect of the direction of gravity on the regulating member. Thus, by selecting a predetermined frequency and by regulating the unbalance of the balance, it is possible to minimise the effect of the direction of gravity on the regulating member.

Nevertheless, these regulations do not allow reducing enough the effect of gravity on the regulating member. Thus, a very high accuracy of the regulating member cannot be reached because of gravity.

Besides, complications of regulating members such as a tourbillon or a karussel are known, which make the regulating member rotate about an axis of rotation with one or two rounds per minute, in order to compensate for the effect of gravity. However, such complications are effective only when the timepiece remains in a stable position. When the direction of gravity with respect to the regulating member changes rapidly, the rotation of the regulating member is not rapid enough to compensate it.

SUMMARY OF THE INVENTION

The present invention aims to overcome all or part of the aforementioned drawback by providing a timepiece regulating member with a balance spring provided with effective and rapid means for gravity compensation.

To this end, the invention relates to a regulating member for a horological movement comprising an oscillating mass, for example a balance, a balance spring comprising a flexible strip coiled on itself in several turns, the strip having a predefined rigidity to enable the oscillating mass to perform a rotary oscillatory movement, the strip comprising an outer end.

The invention is remarkable in that the regulating member comprises a resilient device for compensating the direction of the gravity with respect to the regulating member, the resilient device being configured to adapt its stiffness according to gravity in order to compensate for the effect of gravity on the regulating member, the resilient device comprising a resilient element connecting the outer end to a first non-movable support with respect to the horological movement, as well as prestressing means for applying a variable force or torque on the resilient element according to the direction of gravity with respect to the regulating member.

Thanks to the invention, the prestressing means exert a variable force or torque on the resilient element according to gravity, so that the regulating member keeps an accurate rate in spite of modifications in position with respect to gravity. Indeed, when the direction of gravity with respect to the regulating member changes, the prestressing means modify the force or the torque exerted on the resilient element, so that the stiffness of the set comprising the balance spring and the resilient element is modified. By modifying the stiffness of this set, the rate of the regulating member is adjusted. Consequently, when the direction of gravity with respect to the regulating member changes, the resilient device is mechanically impacted to adjust the rate of the balance spring to this change. The reaction time of the resilient device is very rapid, because it instantaneously adapts to the modification of the direction of gravity.

This resilient element modifies the rigidity of the attachment point and confers an additional flexibility on the resonator. Thus, the effective rigidity of the resonator comprises the rigidity of the strip and the rigidity of the resilient element. The variable force or torque allows prestressing the resilient element, preferably without prestressing the strip and without moving the end of the strip. By prestressing the resilient element, its rigidity changes, whereas the rigidity of the strip remains unchanged, since it is not prestressed and its end does not move. By changing the rigidity of the resilient element, the rigidity of the resonator (i.e. the rigidity of the strip and the rigidity of the resilient element) changes, which consequently changes the rate of the resonator. The resilient element being preferably more rigid than the strip, the contribution of the flexibility of the resilient element in the rigidity of the whole is lower than that of the strip. Consequently, a modification of the rigidity of the resilient element modifies the rigidity of the entire resonator, and consequently finely regulates its rate, which allows accurately adjusting the frequency of the time base. Thus, a great accuracy is obtained in the maintenance of the rate according to gravity.

According to a particular embodiment of the invention, the prestressing means comprise a spring portion connected to the resilient element, the spring portion transmitting the force or the torque to the resilient element.

According to a particular embodiment of the invention, the prestressing means comprise a stressing mass exerting a variable force or torque on the spring portion according to the direction of gravity.

According to a particular embodiment of the invention, the stressing mass comprises an oblique wall in contact with the spring portion, the oblique wall being movable with the stressing mass, so that the variable position of the stressing mass causes a modification of the force exerted on the spring portion.

According to a particular embodiment of the invention, the spring portion comprises a flexible blade connected to the resilient element.

According to a particular embodiment of the invention, the spring portion comprises several secondary flexible blades connecting first and second rigid bodies.

According to a particular embodiment of the invention, the first movable rigid body is connected to the flexible blade.

According to a particular embodiment of the invention, the spring portion comprises a translation table, the prestressing mass being in contact with the translation table.

According to a particular embodiment of the invention, the translation table comprises two tertiary blades and the second rigid body.

According to a particular embodiment of the invention, the regulating member extends substantially in the same plane.

According to a particular embodiment of the invention, the resilient element comprises a suspended body and a pair of uncrossing blades connecting the suspended body to the first non-movable support.

According to a particular embodiment of the invention, the prestressing means are mechanically connected to the suspended body to exert the force or the torque on the suspended body.

The invention also relates to a horological movement including such a regulating member.

BRIEF DESCRIPTION OF THE FIGURES

The aims, advantages and feature of the present invention will appear upon reading several embodiments given only as non-limiting examples, with reference to the appended drawings wherein.

DETAILED DESCRIPTION OF THE INVENTION

Figure 1:
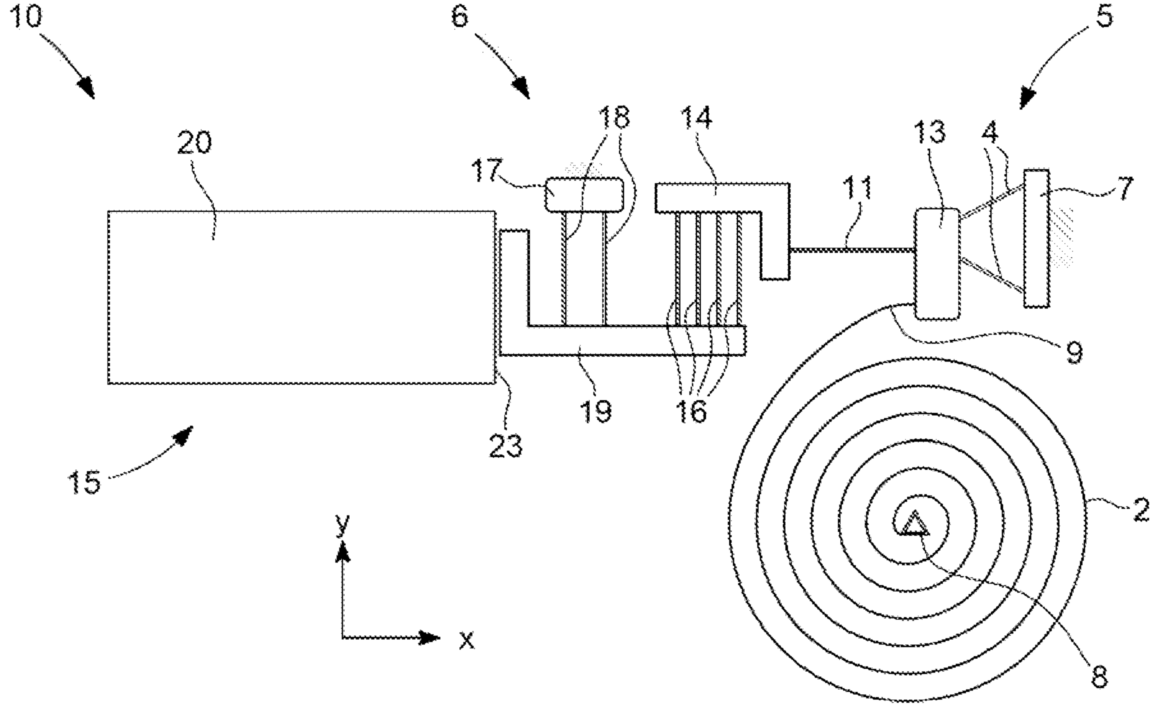
FIG. 1 schematically represents a top view of a regulating member according to an embodiment of the invention, and FIG. 2 schematically represents a side view of the regulating member according to the embodiment of the invention of FIG. 1.
Figure 2:
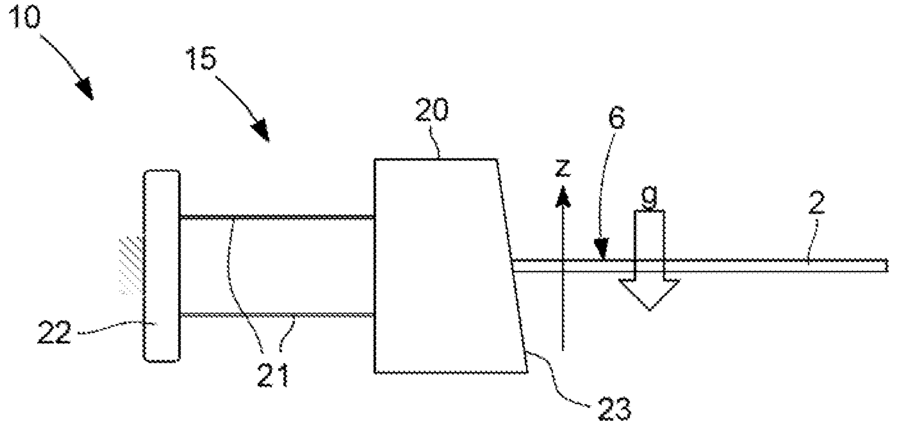

FIGS. 1 and 2 represent an embodiment of a regulating member according to the invention.

The regulating member 10 comprises a balance spring provided with a flexible strip 2 coiled on itself in several turns. The flexible strip 2 comprises an outer end 9 and an inner end 8.

The regulating member 10 comprises an oscillating mass, for example an annular balance, not represented in the figures, which is connected to the inner end 8 of the strip 2, the strip 2 having a predefined rigidity to enable the oscillating mass to perform a rotary oscillatory movement. For example, the oscillating mass comprises an axial rotation shaft, the inner end 8 of the strip 2 being connected to said shaft.

Preferably, the regulating member 10 extends substantially in the same plane (x, y), except for the oscillating mass, which oscillates in a parallel plane, preferably above the balance spring.

According to the invention, the regulating member 10 comprises a resilient device 15 for compensating for the effects of gravity on the regulating member 10 to adapt the stiffness of the resilient element 5 according to the direction of gravity with respect to the regulating member 10.

The resilient device 15 comprises a resilient element 5 connecting the outer end 9 to a non-movable support 7 with respect to the horological movement, for example to a plate. The resilient device 15 further comprises prestressing means 6 for applying a variable force or torque on the resilient element 5 according to the direction of gravity with respect to the regulating member 10.

The resilient element 5 herein comprises a suspended body 13 and a pair of uncrossing blades 4 connecting the suspended body 13 to the non-movable support 7. For example, the suspended body 13 is a parallelepiped shaped body, the uncrossing blades 4 deflecting from the suspended body 13 up to the non-movable support 7.

The resilient element 5 is arranged in the continuation of the flexible strip 2, the balance spring and the resilient element 5 being adjacent, but while avoiding contacts therebetween during the oscillation of the oscillating mass.

The prestressing means 6 are configured to exert the force or the torque on the suspended body 13. The prestressing means 6 comprise a spring portion provided with a flexible blade 11 connected to the suspended body 13. The flexible blade 11 extends in the axis of the resilient element and is offset with respect to the outer end 9.

The outer end 9 of the strip 2 and the flexible blade 11 are connected on the same side of the suspended body 13.

The flexible blade 11 connects the rigid portion of the resilient element 5 to an elbow-like shaped first movable rigid body 14 of the prestressing means 6.

The prestressing means 6 comprise an elbow-like shaped second movable rigid body 19, as well as secondary parallel flexible blades 16 connecting the two rigid bodies 14, 19. The two rigid bodies 14, 19 have sections substantially parallel in pairs in the rest position of the prestressing means 6. The four secondary blades 16 are substantially perpendicular to the flexible blade 11 in the rest position of the prestressing means 6, and produce a spring effect between the two rigid bodies 14, 19. The spring portion of the prestressing means 6 comprises the secondary parallel flexible blades 16.

The spring portion of the prestressing means 6 further comprises two tertiary blades 18 connecting the second body 19 to a second non-movable support 17 with respect to the horological movement, the tertiary blades 18 forming a translation table for guiding the first rigid body 14. The tertiary blades 18 are substantially parallel to the secondary blades and are arranged on the same side of the second rigid body 19. By moving the second movable rigid body 19, the first movable rigid body 14 is, turn, moved via the secondary flexible blades 16, so that a variable force or torque is applied on the suspended body 13. Thus, the rigidity of the resilient element 5, and therefore that of the set comprising the resilient element 5 and the balance spring, is varied.

The prestressing means 6 also comprise a stressing mass 20 whose position in the regulating member 10 is sensitive to gravity.

The stressing mass 20 is connected to a third non-movable support 22 with respect to the movement, such as a plate, thanks to a third pair of flexible blades 21. Thus, the stressing mass 20 is movable in a direction substantially perpendicular to the plane of the balance spring, i.e. according to the z axis.

The stressing mass 20 is herein parallelepipedic provided with an oblique face 23. The stressing mass 20 is disposed so that the oblique face 23 is in contact with the rear of the second body 19. The spring effect produced by the four secondary blades 16 presses the second body 19 against the oblique face 23.

The oblique face 23 forms an angle with the plane x, y different from 90°.

The stressing mass 20 is configured to move according to gravity according to the z axis.

When the direction of gravity is perpendicular to the plane of the regulating member 10 in a first way opposite to the z axis, the stressing mass 20 is pushed downwards, and the oblique face 23 has a portion further away from the second rigid body 19, which moves backwards relative to the first movable rigid body 14. Thus, the stiffness of the resilient element 5 is increased, and therefore that of the regulating member 10 in general.

When the direction of gravity is perpendicular to the plane of the regulating member 10 in a second way according to the z axis, which is opposite to the first way, the stressing mass 20 is pushed upwards, and the oblique face has a portion closer to the second rigid body 19, which advances towards the first movable rigid body 14. Thus, the stiffness of the resilient element 5 is reduced, and therefore that of the regulating ember 10 in general.

When the direction of gravity is in the plane x, y of the regulating member 10, the stressing mass 20 remains in a mean position.

All intermediary directions of gravity are possible, so that the stressing mass 20 substantially pushes the second rigid body 19 according to this direction, according to the portion of the oblique face 23 in contact with the second rigid body 19.

Depending on the direction of gravity, the stressing mass 20, and therefore the oblique face 23 rises and descends, so that it substantially pushes the second rigid body 19 towards the first rigid body 14. Thus, depending on the direction of gravity with respect to the stressing mass 20, the stiffness of the resilient element 5, and therefore the rate of the regulating member 10, is modified.

The invention also relates to a horological movement, not represented in the figures, the movement comprising a regulating member 10 as described before.

It goes without saying that the invention is not limited to the embodiments described with reference to the figures and alternatives can be considered without leaving the scope of the invention.

The invention claimed is:

1. A regulating member for a horological movement comprising an oscillating mass, a balance spring comprising a flexible strip coiled on itself in several turns, the strip having a predefined rigidity to enable the oscillating mass to perform a rotary oscillatory movement, the strip comprising an outer end, wherein the regulating member comprises a resilient device for compensating the direction of the gravity with respect to the regulating member, the resilient device being configured to adapt its stiffness according to gravity in order to compensate for the effect of gravity on the regulating member, the resilient device comprising a resilient element connecting the outer end to a first non-movable support with respect to the horological movement, as well as prestressing means for applying a variable force or torque on the resilient element according to the direction of gravity with respect to the regulating member.

2. The regulating member according to claim 1, wherein the prestressing means comprise a stressing mass exerting a variable force or torque on the spring portion according to the direction of gravity.

3. The regulating member according to claim 2, wherein the prestressing means comprise a spring portion connected to the resilient element, the spring portion transmitting the force or the torque to the resilient element.

4. The regulating member according to claim 3, wherein the stressing mass comprises an oblique wall in contact with the spring portion, the oblique wall being movable with the stressing mass, so that the variable position of the stressing mass causes a modification of the force exerted on the spring portion.

5. The regulating member according to claim 3, wherein the spring portion comprises a flexible blade connected to the resilient element.

6. The regulating member according to claim 5, wherein the spring portion comprises several secondary flexible blades connecting first and second rigid bodies.

7. The regulating member according to claim 6, wherein the first movable rigid body is connected to the flexible blade.

8. The regulating member according to claim 7, wherein the spring portion comprises a translation table, the prestressing mass being in contact with the translation table.

9. The regulating member according to claim 8, wherein the translation table comprises two tertiary blades and the second rigid body.

10. The regulating member according to claim 1, wherein the regulating member extends substantially in the same plane.

11. The regulating member according to claim 1, wherein the resilient element comprises a suspended body and a pair of uncrossing blades connecting the suspended body to the first non-movable support.

12. The regulating member according to claim 11, wherein the prestressing means are mechanically connected to the suspended body to exert the force or the torque on the suspended body.

13. A horological movement comprising the regulating member, according to claim 1.

* * * * *